United States Patent
He et al.

(10) Patent No.: US 12,551,820 B2
(45) Date of Patent: Feb. 17, 2026

(54) LOW-PRESSURE DROP ETHYLBENZENE EVAPORATOR AND ENERGY-SAVING PROCESS FOR ETHYLBENZENE VAPORIZATION IN STYRENE DEHYDROGENATION REACTION SYSTEM

(71) Applicant: CHANGZHOU RUIHUA CHEMICAL ENGINEERING TECHNOLOGY CO., LTD., Jiangsu (CN)

(72) Inventors: Chenggang He, Jiangsu (CN); Jiahui Gu, Jiangsu (CN); Jing Zhang, Jiangsu (CN); Haiyan Zhou, Jiangsu (CN); Zhigang Xu, Jiangsu (CN)

(73) Assignee: CHANGZHOU RUIHUA CHEMICAL ENGINEERING TECHNOLOGY CO., LTD., Jiangsu (CN)

( * ) Notice: Subject to any disclaimer, the term of this patent is extended or adjusted under 35 U.S.C. 154(b) by 124 days.

(21) Appl. No.: 18/555,757

(22) PCT Filed: Jul. 22, 2022

(86) PCT No.: PCT/CN2022/107413
§ 371 (c)(1),
(2) Date: Oct. 17, 2023

(87) PCT Pub. No.: WO2023/050985
PCT Pub. Date: Apr. 6, 2023

(65) Prior Publication Data
US 2024/0207755 A1 Jun. 27, 2024

(30) Foreign Application Priority Data
Sep. 28, 2021 (CN) .......................... 202111144648.2

(51) Int. Cl.
*B01D 1/22* (2006.01)
*B01D 1/30* (2006.01)
*C07C 5/327* (2006.01)

(52) U.S. Cl.
CPC ................. *B01D 1/22* (2013.01); *B01D 1/30* (2013.01); *C07C 5/327* (2013.01)

(58) Field of Classification Search
CPC .............. B01D 1/22; B01D 1/30; C07C 5/327
See application file for complete search history.

(56) References Cited

U.S. PATENT DOCUMENTS 3,397,731 A * 8/1968 Wood ........................ C07C 7/11
159/46
3,605,850 A * 9/1971 Borst ...................... B01D 3/343
159/901

(Continued)

FOREIGN PATENT DOCUMENTS

| CN | 101825271 | 9/2010 |
| CN | 102258877 | 11/2011 |

(Continued)

OTHER PUBLICATIONS

Espacenet Machine Translation of CN106287627 Obtained Jun. 24, 2025. (Year: 2025).*

(Continued)

*Primary Examiner* — Jonathan Miller
(74) *Attorney, Agent, or Firm* — Barnes & Thornburg LLP

(57) ABSTRACT

Disclosed herein is a low-pressure drop ethylbenzene evaporator, comprising a double-layer structure consisting of a heat exchange unit and a gas-liquid separation unit, the upper layer and the lower layer thereof being connected via an intermediate pipe. The top of the gas-liquid separation unit is provided with an exhaust pipe, and the bottom is (Continued)

provided with a separated liquid return pipe. The heat exchange unit comprises a housing side and a heat exchange pipe, the bottom of the housing side being provided with a liquid flow inlet, and a low-pressure vapor feed pipe being disposed on a side wall of the housing side, located below the heat exchange pipe and close to the position of the heat exchange pipe. In an energy saving process for ethylbenzene vaporization of the present application, a large amount of heat is recovered by means of a main cooler to generate a vapor at 6-32 kpaA, which is used for primary vapor distribution of the ethylbenzene vaporizer design of the present application after being pressurized by a compressor, and is used to replace supplemental 0.21 MPaG low-pressure vapor for a vapor pipe network of a related device, greatly reducing consumption of low-pressure steam in the reaction system, as well as decreasing the amount of circulating water used in the device. The process only consumes the power consumption of a compressor, and saves a large amount of low-pressure vapor and circulating water.

3 Claims, 4 Drawing Sheets

(56) References Cited

U.S. PATENT DOCUMENTS

| | | | | |
|---|---|---|---|---|
| 3,691,020 A | * | 9/1972 | Hughes | C02F 1/048 159/DIG. 10 |
| 4,322,265 A | * | 3/1982 | Wood | B01D 1/14 159/24.2 |
| 2005/0245779 A1 | * | 11/2005 | Oleksy | B01D 3/14 422/600 |

FOREIGN PATENT DOCUMENTS

| | | | | |
|---|---|---|---|---|
| CN | 102288051 | | 12/2011 | |
| CN | 204177245 | | 2/2015 | |
| CN | 106287627 | | 1/2017 | |
| CN | 206334367 | | 7/2017 | |
| CN | 107540508 | | 1/2018 | |
| CN | 106287627 B | * | 7/2018 | ............ F22B 1/1884 |
| CN | 207880443 | | 9/2018 | |
| CN | 209745057 | | 12/2019 | |
| CN | 211935622 | | 11/2020 | |
| CN | 113941163 | | 1/2022 | |
| GB | 588820 | | 12/1942 | |
| GB | 1333940 | | 11/1970 | |
| GB | 1443814 | | 7/1973 | |
| RU | 2120431 C1 | | 10/1998 | |
| RU | 2678094 C1 | | 1/2019 | |

OTHER PUBLICATIONS

PCT Search Report and Written Opinion prepared for PCT Application No. PCT/CN2022/107413, completed Oct. 8, 2022.

Chinese Office Action for Chinese Patent Application Serial No. 202111144648.2, prepared Aug. 10, 2022.

Supplementary European Search Report and Written Opinion prepared for European Application No. 22874382.9, mailed Feb. 7, 2025.

Notice of Allowance for Russian Patent Application No. 2024111499/04(025888), mailed May 6, 2025.

* cited by examiner

LOW-PRESSURE DROP ETHYLBENZENE EVAPORATOR AND ENERGY-SAVING PROCESS FOR ETHYLBENZENE VAPORIZATION IN STYRENE DEHYDROGENATION REACTION SYSTEM

CROSS-REFERENCE TO RELATED APPLICATIONS

This application is the U.S. national phase of PCT/CN2022/107413, filed on Jul. 22, 2022, which claims priority to Chinese Patent Application 202111144648.2, filed on Sep. 28, 2021. The disclosures of both Chinese Patent Application 202111144648.2 and PCT/CN2022/107413 are hereby incorporated herein by reference in their entireties.

TECHNICAL FIELD

The present application relates to the field of chemical technology, for example, an energy-saving process in which ethylbenzene as raw material for a styrene device is vaporized by distributing water steam, and a core device.

BACKGROUND

Styrene is one of the most important basic organic chemical raw materials, and the vast majority is obtained from the method of ethylbenzene adiabatic vacuum dehydrogenation process. Styrene is mainly used in polystyrene/expanded polystyrene (PS/EPS), ABS, styrene-acrylonitrile copolymer (SAN), unsaturated polyester resin (UPR), styrene butadiene rubber (SBR), styrene thermoplastic elastomer (SBS), and other chemical products.

The styrene device overall adopts the method of ethylbenzene adiabatic vacuum dehydrogenation process. Since styrene is a heat-sensitive material, a large amount of steam is consumed in the reaction unit and distillation unit of the device, and the overall energy consumption of the device is relatively high, so how to save energy has become the focus of research. The energy consumption of the distillation unit is mainly the consumption of ethylbenzene/styrene separation. For the energy saving measures of ethylbenzene/styrene separation, a large amount of researches have been carried out domestically and internationally, and all kinds of technical solutions have been proposed.

Patent CN200810043495.0 discloses that the ethylbenzene/styrene separation tower is divided from a single-tower operation into a two-tower operation, part or all of the steam at the top of the ethylbenzene/styrene separation tower A is all introduced into the compressor, and the pressurized gas serves as the heat source for the re-boiler at the bottom of ethylbenzene/styrene separation tower B. The used technical solution can effectively reduce operational energy consumption and styrene polymerization losses.

Patent 201410670489.3 discloses that the dehydrogenated liquid containing ethylbenzene and styrene is added into the ethylbenzene/styrene separation tower T101 to obtain a top gas stream I containing ethylbenzene, which is compressed and then added into the ethylbenzene/water azeotropic evaporator to heat the ethylbenzene/water mixture from outside the boundary. The heat exchanged ethylbenzene/water azeotrope is obtained and added to the reaction unit. The stream I is condensed and partially returned to the top of the tower T101, and partially extracted and added to the ethylbenzene separation tower. The ethylbenzene separation tower is divided into two towers (T102A and T102B) for operation. The T102A tower has a higher pressure and the T102B tower has a lower pressure. The technical solution of using the top gas phase of Tower A to heat the liquid at the bottom of Tower B can effectively solve the problem of high energy consumption in industrial device of the styrene separation system.

Patent 201610491783.7 discloses that a dehydrogenated liquid preheater is added behind the constant boiling heat exchanger at the top of an ethylbenzene/styrene distillation separation tower. The uncondensed gas materials in the constant boiling heat exchanger enter the dehydrogenated liquid preheater to exchange heat with the dehydrogenated liquid, so that the dehydrogenated liquid entering the dehydrogenated liquid preheater is heated, and the dehydrogenated liquid pre-separation tower is heated from normal temperature feeding to bubble point feeding. At the same time, the gas phase material is cooled and partially condensed, and the uncondensed gas phase material enters the tail gas condenser to be cooled and condensed. By using this energy-saving method, the consumption of circulating cooling water and heating steam is reduced.

A lot of patents have been reported on energy-saving methods for ethylbenzene/styrene separation, and the energy-saving methods for styrene reaction unit mainly focus on the study of low water ratio. However, due to the limitation of the catalyst coking, the current low water ratio can only be 1.0 (the weight ratio of water steam to ethylbenzene), and further energy-saving has limited room. Therefore, the research on other energy-saving processes of reaction unit has become a hot spot.

In the related styrene process, the primary steam distribution of ethylbenzene evaporator uses 0.3 MPaG of low-pressure steam mixed with liquid ethylbenzene to vaporize part of ethylbenzene, which has a large amount of steam and high energy consumption. If 0.04 MPaG of low & low-pressure steam can be used as the primary steam distribution of ethylbenzene vaporization, the energy consumption of styrene reaction unit will be greatly reduced. At present, the main bottleneck problem that ethylbenzene evaporator cannot use 0.04 MPaG of low & low-pressure steam as primary steam distribution is the device structure and steam distribution control process of ethylbenzene vaporizer, both of them cause the steam pressure entering the ethylbenzene vaporizer necessary to be above 0.2 MPaG, so if the above bottleneck problem can be solved, the energy-saving process of ethylbenzene vaporization can be achieved. Moreover, the industrialized ethylbenzene vaporizer still has the problem of tube bundle vibration damage at present.

SUMMARY

The following is a summary of the topics described herein. This summary is not intended to limit the scope of protection of the claims.

A technical problem need be solved by the present application is that the primary steam distribution of ethylbenzene evaporator in the existing styrene technology uses low-pressure steam of 0.3 MpaG, leading to high energy consumption of the device. The present application provides an energy-saving process by using a low & low-pressure steam of 0.04 MPaG as the primary steam distribution and a low-pressure drop ethylbenzene vaporizer for matching use, which can effectively reduce the energy consumption of styrene reaction units.

A technical solution used in an embodiment of the present application is:
a low-pressure drop type ethylbenzene evaporator includes a heat exchange unit, further includes a gas-liquid separation unit which realizes gas-liquid separation of the inflowing vaporized mixture, and forms a double-layer structure with the heat exchange unit, the gas-liquid separation unit on the upper layer is connected with the heat exchange unit on the lower layer by setting an intermediate tube;

the gas-liquid separation unit is equipped with an exhaust tube at the top and a separation liquid return tube at the bottom;

the heat exchanger unit is a horizontal shell-and-tube type heat exchanger unit, which includes a shell side, a tube box located at one end of the shell side, a heat exchange tube located in the middle of the plates of tube box tube and placed horizontally; the tube box is equipped with a heat medium inlet and a heat medium outlet, and the bottom of the shell side is equipped with a liquid reaction stream inlet;

the side wall of the shell is also equipped with a low-pressure steam feed tube which is located below the heat exchange tube and at a position close to the heat exchange tube.

In an embodiment of the present application, due to the short range pressure drop of only gas-liquid two phases in the liquid layer at the top of the steam feed distributor, in order to make the ethylbenzene enter from the bottom of the ethylbenzene evaporator more easily vaporized, 0.04 MpaG of steam distributed more evenly on the shell side well and get a good utilization, the low-pressure steam feed tubes has a number of 6-10, and are evenly distributed horizontally.

At the same time, a steam distributor is placed, which is connected to a low-pressure steam feed tube, and nozzles are uniformly distributed on the steam distributor for spraying in all directions.

In this way, the method of one-time dispensing water steam into the ethylbenzene evaporator is changed into a method of a multi-inlet system and entering from the bottom of the heat exchange tube, further cooperating with a steam distributor, the steam is changed from the two-points-entering of the original process to a method of entering from a multi-point and multi-angle entering and mixing with ethylbenzene for vaporization. The gas-liquid distribution is more uniform, the vibration of the tube bundle caused by the unevenness of the gas-liquid phase during vaporization is avoided, and the problem of vibration damage of the ethylbenzene vaporizer tube bundle is solved.

In order to prevent gas-phase materials from flowing out of the separation liquid return tube, an outlet end of the separation liquid return tube is located above the heat exchange tube and close to the heat exchange tube.

In an embodiment of the present application, the heat exchange tube is a "U" shaped tube bundle with 4-6 layers. The horizontally arranged tube bundle has a low height, which can reduce the pressure drop of the hydrostatic fluid column of the device, so that low & low-pressure water steam can enter the ethylbenzene evaporator under low pressure drop.

In an embodiment of the present application, in order to ensure that a flow rate of the vaporized reaction stream is controlled below 10 m/s and achieve gas-liquid separation at the top of the gas-liquid separation unit, and prevent damage to a downstream device caused by the assigned liquid, a cross-sectional radius of the gas-liquid separation unit is greater than a diameter of the intermediate tube.

An embodiment of the present application relates to an energy-saving process for low-pressure ethylbenzene vaporization in a styrene device, including the following steps:

a) setting up a main cooler, an aftercooler, and an oil-water separation tank; allowing styrene dehydrogenation reaction material as a raw material and boiler feed water to enter a shell side and a tube side of the main cooler respectively for heat exchange, controlling an outlet pressure on the tube side at 6-32 kpaA, and pressurizing the unevaporated water on the tube side by a water circulation pump before returning to the tube side with the raw material boiler feed water;

after cooling the styrene dehydrogenation reaction material, a liquid phase formed by gas-liquid separation enters the oil-water separation tank, then cooling a formed gas phase again by the aftercooler, and the separated secondary liquid phase enters the oil-water separation tank, and a separated tail gas enters a subsequent treatment unit; and b) setting up a steam compressor and the low-pressure drop type ethylbenzene evaporator according to claim 1, steam of 6-32 kpaA generated on the tube side of the main cooler is compressed into saturated steam of 0.04 MpaG by the steam compressor as steam distribution to enter the shell side together with raw material ethylbenzene through a low-pressure steam feed tube and a liquid stream inlet of the low-pressure drop type ethylbenzene evaporator respectively, and heating and evaporating by introducing a hot steam into the heat exchange tube to form a mixture of ethylbenzene and water steam, which enters a superheater to form a next process.

In order to effectively solve the problem of static liquid column pressure, the main cooler adopts a falling-film heat exchanger with a temperature difference range of 10-12° C.; a pressure drop of the falling film heat exchanger decreases, which is more conducive to generating steam.

In an embodiment of the present application, the steam compressor is a multi-stage centrifugal compressor with an outlet pressure range of 90-160 kpaA, which meets the requirements for primary steam distribution of the ethylbenzene vaporizer.

The principles and beneficial effects of the embodiments of the present application are:

The special form of low-pressure drop type ethylbenzene evaporator designed in the embodiment of the present application is that the steam inlet is set at the bottom of the heat exchange tube bundle to reduce the height of the liquid layer and generate a pressure drop, so that the low & low-pressure steam can smoothly enter the evaporator; to ensure the mixed gasification effect of steam and ethylbenzene, a steam distributor is located to enhance the heat exchange effect. The steam distributor is equipped with multi-angle nozzles to fully mix ethylbenzene and water steam, and ensures the temperature difference of the heat exchanger. Moreover, uniformly distributed ethylbenzene and water steam do not cause strong vibration, and the heat exchange tube can avoid vibration and erosion damage, ensuring long-term stable operation of the heat exchanger.

The dehydrogenation reaction materials in the styrene device in the embodiment process of present application are all gas-phase materials in front of the main cooler. The heat recovered and utilized from the reaction materials at about 565° C. at the reactor outlet to the front of the main cooler is all sensible heat and has limited energy. The main problem causing high energy consumption in the styrene device is the loss of condensation heat of the reaction materials. In present application process, the above low-pressure drop type ethylbenzene evaporator structure is fully utilized. By designing the process route, a large amount of condensation heat of dehydrogenation reaction materials is recovered, and 6-32 kpaA of steam is generated. After being pressurized by a steam compressor, the steam is used for primary steam distribution in the ethylbenzene vaporizer to replace supplemental 0.21 MPaG of low-pressure steam for a steam tube network of a related device, which significantly reduce the amount of low-pressure steam used in the reaction system, meanwhile reduce the use of circulating water in the device. The process only consumes the electricity consumption of the compressor, greatly saves the amount of low-pressure steam and circulating water, and achieves significant energy-saving effects.

After reading and understanding the drawings and detailed descriptions, other aspects can be understood.

BRIEF DESCRIPTION OF DRAWINGS

The drawings are used to provide a further understanding of the technical solutions herein, and form a part of the specification. The drawings are used to explain the technical solutions herein in conjunction with the embodiments of the present application, and have no limitation on the technical solutions herein.

DETAILED DESCRIPTION

Example 1

Figure 2:
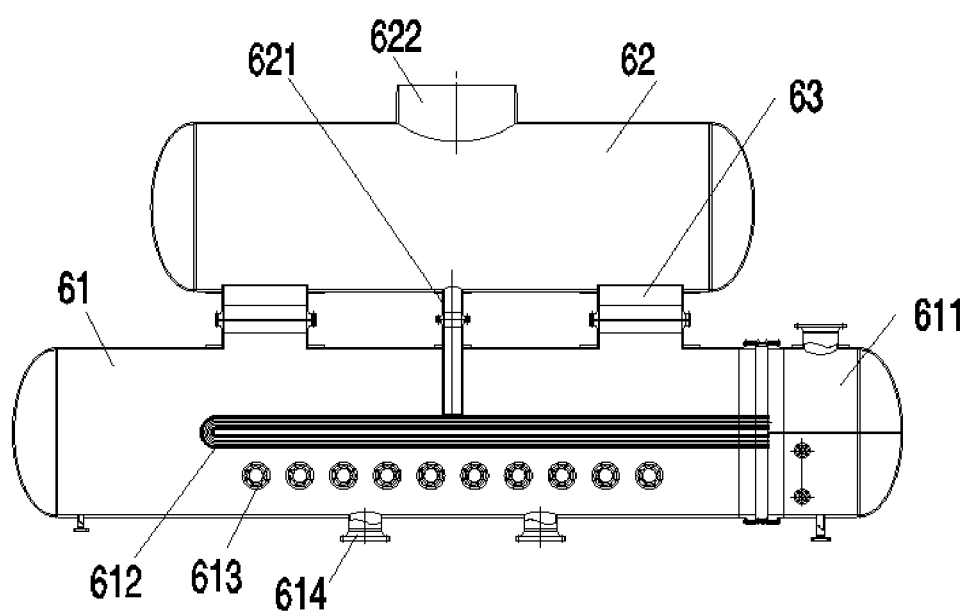
FIG. 2 is a structure schematic diagram of the low-pressure drop ethylbenzene vaporizer in the embodiment of the present application.
Figure 3:
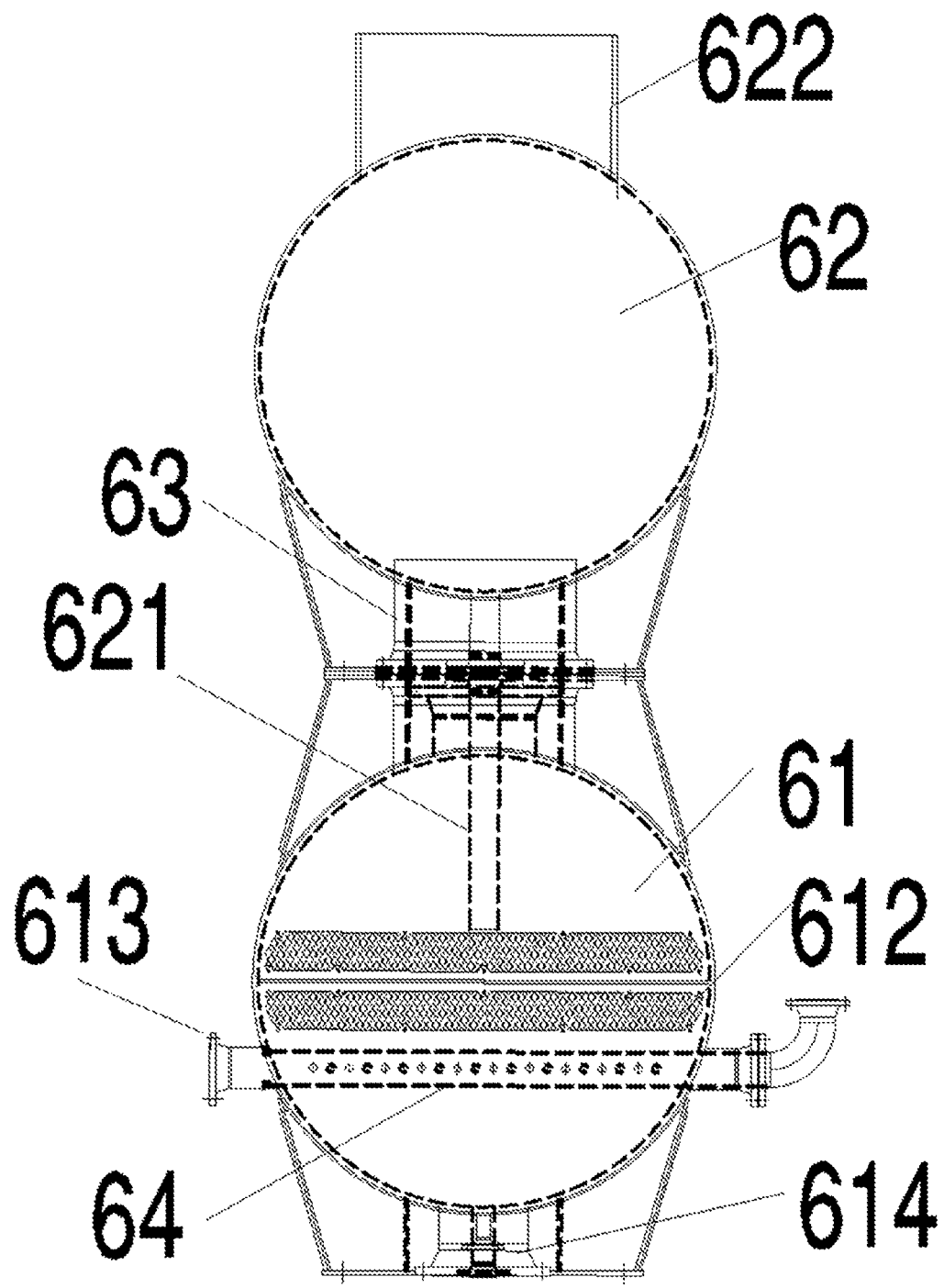
FIG. 3 is a side view of the low-pressure drop ethylbenzene vaporizer in the embodiment of the present application.

FIG. 2 and FIG. 3 show that a low-pressure drop ethylbenzene evaporator includes a heat exchange unit 61, and further includes a gas-liquid separation unit 62 which realizes gas-liquid separation of the inflowing vaporized mixture, and forms a double-layer structure with the heat exchange unit 61. The gas-liquid separation unit 62 on an upper layer is connected with the heat exchange unit 61 on a lower layer by two intermediate tubes 63 arranged on the left and right. The top of the gas-liquid separation unit 62 is equipped with an exhaust tube 622, and the bottom is equipped with a separation liquid return tube 621. In order to prevent gas-phase materials escaping from the separation liquid return tube, an outlet end of the separation liquid return tube 621 is located above a heat exchange tube 612 and close to the heat exchange tube. When the ethylbenzene evaporator 6 is working, the ethylbenzene liquid just overflows from the outlet end of the separation liquid return tube, which can decrease the height of the ethylbenzene liquid as much as possible.

The heat exchange unit 61 is a horizontal shell-and-tube heat exchange unit, which includes a shell side, a tube box 611 located at one end of the shell side, and a heat exchange tube 612; the heat exchange tube 612 is a "U" shaped tube bundle, which is horizontally arranged on the middle of the tube plates. A designed number of the heat exchange tube layers is preferably 4-6, and in this example it is 5 layers. A low height of the tube bundle can reduce the hydrostatic column pressure drop of the device.

The tube box 611 is equipped with a heat medium inlet and a heat medium outlet. In this example, the heat medium inlet is located at the upper end, which is used to pass through 0.21 MPaG of heating steam during operation; the heat medium outlet is located at the lower end of the tube box, and a water steam condensate level gauge is also located on the tube box to control the stable discharge of the condensate.

The bottom of the shell side is equipped with a liquid reaction stream inlet 614, which is used for passing through liquid ethylbenzene during operation; in order to allow the water steam pressurized by the compressor to enter the shell side of the ethylbenzene evaporator at a low pressure drop, several low-pressure steam feed tubes 613 are located on the side wall of the shell side, located below the heat exchange tube and close to the heat exchange tube 612. The low-pressure steam feed tubes 613 are used to add 0.04 MpaG steam during operation.

A number of low-pressure steam feed tubes 613 is preferably 6-10. In this example, the number is 9, and the feed tubes are equipped with a steam distributor 64 to ensure uniform steam distribution. Due to the short range pressure drop of gas-liquid phase in the liquid layer at the top of the steam distributor, the ethylbenzene entering from the bottom of the ethylbenzene evaporator is more easily gasified, and the steam of 0.04 MpaG is well utilized.

In order to ensure that a flow rate of the vaporized material is controlled below 10 m/s and achieve gas-liquid separation at the top of gas-liquid separation unit 62, in order to prevent damage to a downstream device caused by the assigned liquid, the gas-liquid separation unit has a circular cross-section with a radius greater than a diameter of the intermediate tube.

The working principle of the present application is: the steam of 0.04 MpaG generated by a steam compressor pressurization together with ethylbenzene enter the shell side of ethylbenzene evaporator and are indirectly heated by the steam of 0.21 MPaG in the tube side and then evaporated.

A gas-liquid separation of the mixture of vaporized ethylbenzene and water steam is realized in the upper gas-liquid separation unit to prevent the assigned liquid to damage a downstream device, and finally vaporized ethylbenzene and water steam flow out of the exhaust tube, and the separated liquid flows back into the heat exchange unit through the separation liquid return tube.

In the present application, the shell side of ethylbenzene evaporator is operated at 90 KPaA which is close to normal pressure, and a steam pressure is 0.04 MpaG, so the pressure difference between them is small.

The present application solves the problem that 0.04 MpaG of steam cannot be used due to the high pressure drop of the related ethylbenzene vaporizer.

Figure 4:
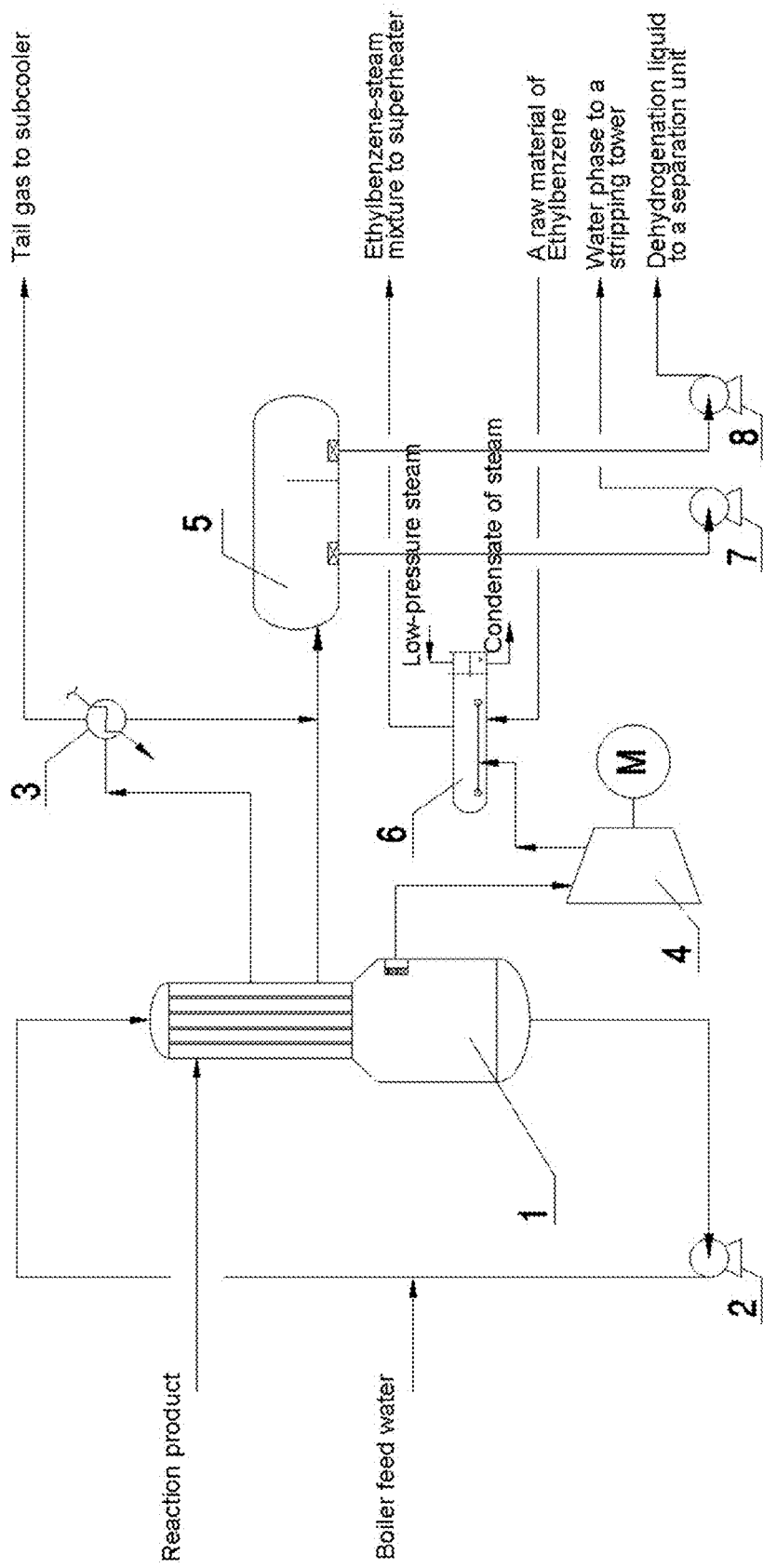
FIG. 4 is a schematic diagram of the energy-saving process for ethylbenzene vaporization in the embodiment of the present application.

FIG. 4 shows that the energy-saving process of ethylbenzene vaporization in the styrene dehydrogenation reaction system in this example includes the following steps.

The specific operation process of this example is as follows. The dehydrogenation reaction product gas reaction stream mainly containing ethylbenzene, styrene and water steam was quenched to about 67° C. by quench water, and entered the shell side of the main cooler 1. The main cooler 1 adopted a falling-film heat exchanger, and the tube side medium was boiler feed water and an outlet pressure was controlled at 12 kpaA, that is, the boiler feed water was heated to generate 12 kpaA steam (a temperature is 49.6° C.); the water that had not been evaporated was pressurized by the water circulating pump 2 and then entered the top tube box of the main cooler 1 together with the boiler feed water out of boundary. After the dehydrogenation reaction product was cooled to 60° C., the gas-liquid separation was realized, and the separated liquid phase entered the oil-water separation tank 5; the separated gas phase entered the aftercooler 3, and was cooled to 38° C. by circulating water in the aftercooler 3. The liquid phase formed by the aftercooler 3 entered the oil-water separation tank 5, while the uncondensed tail gas entered subcooler to continue cooling. The subsequent process was the same as the conventional process.

After the steam of 12 kpaA generated by the main cooler 1 was compressed to 0.04 MPaG by the steam compressor 4 in three-stage, the saturated steam of 0.04 MPaG used as a process distributed gas and ethylbenzene entered the shell side of the low-pressure drop ethylbenzene evaporator 6 designed by the present application. The saturated steam was indirectly heated by the steam of 0.21 MPaG in the tube side, and then evaporated to obtain the ethylbenzene-water steam mixture at about 98° C., and then entered the shell side of the superheater for subsequent processes.

A steam pressure generated by the main cooler involved in the present application was preferably 12-16 kpaA, and in this example was 12 kpaA.

In this example, the compressor adopted a multi-stage centrifugal compressor, and a design range of compressor outlet pressure was preferably 120-140 kpaA, which met the requirements of primary steam distribution of ethylbenzene vaporizer.

In this example, the falling-film main cooler was used, the pressure was low, and a steam gas-liquid separation tank was directly arranged below the main cooler. The partially gasified water could directly enter the tank below, the steam entered the steam compressor, and the water that was not evaporated was recycled. Due to the low steam pressure of 12 kpaA, the conventional horizontal heat exchanger will affect the gasification of water because of the hydrostatic column pressure. The falling-film heat exchanger can effectively solve the problem of hydrostatic column pressure, and the pressure drop of the falling-film heat exchanger was low, which was more conducive to the generation of steam. In this example, the main cooler in falling-film form adopted a vertical structure, and a design temperature difference range was preferably 10-12° C.

Figure 1:
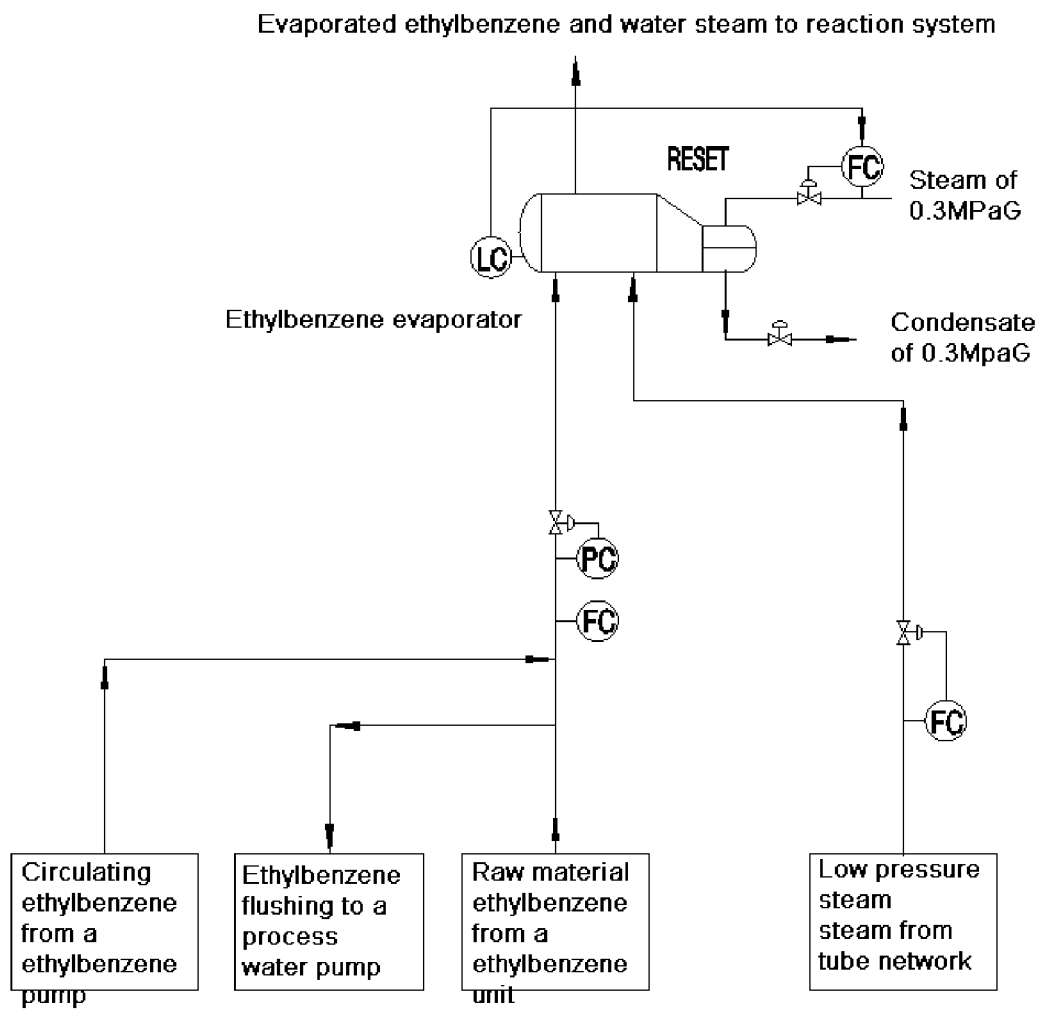
FIG. 1 is a conventional process flow of ethylbenzene vaporization.

Comparative analysis between this example and the original process Ethylbenzene evaporator was a process device in which liquid-phase raw material ethylbenzene and mixed steam were completely converted into gas phase and entered the reaction system. The mixture of ethylbenzene and steam was evaporated on the shell side at about 95° C., and the tube side was heated by steam at about 140° C. According to the process requirements, the vaporization of the raw material ethylbenzene needed to be equipped with a certain proportion of steam, which was about 30% of ethylbenzene flow, and therefore, the demand for steam was large. At present, in the conventional process, FIG. 1 shows that a low-pressure steam of 0.3 MPaG was used for the primary steam distribution of ethylbenzene evaporator, which had high energy consumption. Both liquid ethylbenzene and water steam entered the ethylbenzene evaporator from the bottom of the heat exchanger, due to the pressure drop caused by the height of static liquid column, the pressure drop of steam regulating valve, the pressure drop of tube and so on, the steam pressure entering ethylbenzene evaporator needed to be above 0.2 MPaG, and it was impossible to use the low & low-pressure steam of 0.04 MPaG recovered by the device as a primary distributed steam. On the other hand, due to the uneven gas-liquid two-phase after liquid ethylbenzene and water steam entered the shell side in the conventional heat exchanger, the heat exchange tube bundle vibrated, and the heat exchange tube was easy to be damaged for about 2 years, which affected the stable operation of the device.

Example 2

Taking the production of a 600000 ton/year styrene device (with an annual operating time of 8000 h) as an example:

The conventional process is shown in FIG. 1, the main cooler cooled the dehydrogenation reaction stream to 52° C., and the cooled reaction stream was gas-liquid two-phase and gas-liquid separation was achieved. The uncooled gas phase entered the aftercooler and was cooled to 38° C. with circulating water. The reaction stream was cooled into a liquid phase and entered the oil-water separation tank, and the uncondensed gas entered the subcooler to continue to be cooled. The circulating water of the main cooler and the aftercooler was in series connection, a total of 8568 t/h of circulating water was consumed. According to the "Energy Consumption Standards for Petrochemical Design" GB/T-50441, the energy consumption for this part was 6.9 kg standard oil/t styrene.

By using the energy-saving process shown in FIG. 4, the dehydrogenation reaction airflow at 67° C. was cooled to 60° C. through the main cooler, and a total of 41 t/h of 12 kpaA steam was generated on the tube side. After being compressed to 0.04 MPaG by a steam compressor, the steam was used as a process distributed gas to enter the ethylbenzene evaporator, the steam compressor was equipped with a motor power of 6400 kW, and a power consumption of the water circulation pump was 20 kW. After the dehydrogenation reaction airflow was cooled to 60° C., it formed a gas-liquid phase. The liquid phase entered the oil-water separation tank, and the gas phase entered the aftercooler and was cooled to 38° C. with circulating water. The secondary-cooled liquid phase entered the oil-water separation tank, and the uncondensed gas entered the subcooler to continue to be cooled. The aftercooler consumed 6658 t/h of circulating water.

It can be seen that the energy-saving process involved in the present application can reduce the energy consumption of 12.3 kg standard oil/t styrene in the styrene reaction unit, and the energy-saving effect was obvious.

What is claimed is:

1. An energy-saving process for ethylbenzene vaporization in a styrene dehydrogenation reaction system, comprising:
    a) setting up a main cooler, an aftercooler, and an oil-water separation tank; allowing styrene dehydrogenation reaction material as a raw material and boiler feed water to enter a shell side and a tube side of the main cooler respectively for heat exchange, controlling an outlet pressure on the tube side at 6-32 kpaA, and pressurizing the unevaporated water on the tube side by a water circulation pump before returning to the tube side with the raw material boiler feed water;
    after cooling the styrene dehydrogenation reaction material, a liquid phase formed by gas-liquid separation enters to the oil-water separation tank, then cooling a formed gas phase again by the aftercooler, and a separated secondary liquid phase enters the oil-water separation tank, and a separated tail gas enters a subsequent treatment unit; and
    b) setting up a steam compressor and a low-pressure drop type ethylbenzene evaporator, steam of 6-32 kpaA generated on the tube side of the main cooler is compressed into saturated steam of 0.04 MpaG by the steam compressor as steam distribution to enter the shell side together with raw material ethylbenzene through a low-pressure steam feed tube and a liquid stream inlet of the low-pressure drop type ethylbenzene evaporator respectively, and heating and evaporating by introducing a hot steam into the heat exchange tube to form a mixture of ethylbenzene and water steam, which enters a superheater;

wherein the low-pressure drop type ethylbenzene evaporator comprises a heat exchange unit, wherein, the low-pressure drop type ethylbenzene evaporator further comprises a gas-liquid separation unit that separates an inflowing vaporized mixture and forms a double-layer structure with the heat exchange unit;

the gas-liquid separation unit on an upper layer is connected with the heat exchange unit on a lower layer through an intermediate tube;

a top of the gas-liquid separation unit is equipped with an exhaust tube, and a bottom of the gas-liquid separation unit is equipped with a separation liquid return tube;

the heat exchange unit is a horizontal shell-and-tube type heat exchange unit, which comprises a shell side, a tube box located at one end of the shell side, and a heat exchange tube placed horizontally in the middle of plates of the tube box;

the tube box is equipped with a heat medium inlet and a heat medium outlet, and a bottom of the shell side is equipped with a liquid stream inlet;

a side wall of the shell side is also equipped with low-pressure steam feed tubes located below and close to the heat exchange tube.

2. The energy-saving process for ethylbenzene vaporization in a styrene dehydrogenation reaction system according to claim 1, wherein the main cooler comprises a falling-film heat exchanger with a temperature difference range of 10-12° C.

3. The energy-saving process of ethylbenzene vaporization in the styrene dehydrogenation reaction system according to claim 1, wherein, the steam compressor is a multi-stage centrifugal compressor with an outlet pressure range of 90-160 kpaA.

* * * * *